Inventor:
Horace S. Hubbard;
by Charles E. Tullar
His Attorney.

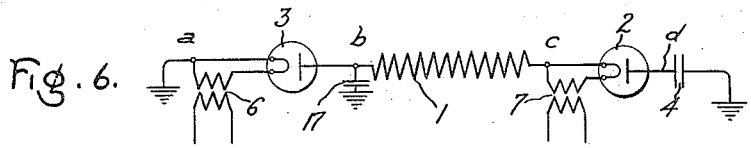
Fig. 6.
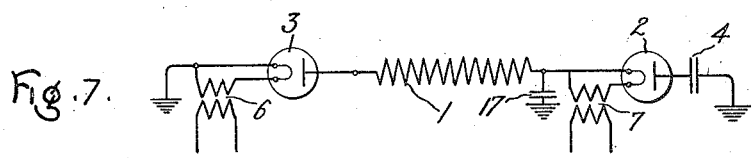
Fig. 7.
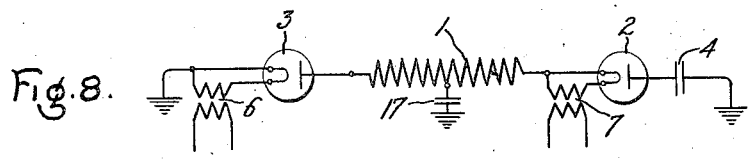
Fig. 8.
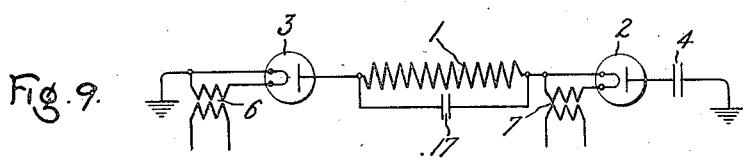
Fig. 9.
Fig. 10.
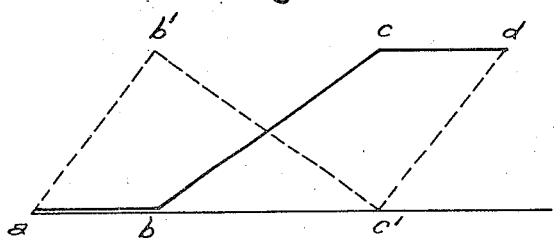
Inventor:
Horace S. Hubbard;
by Charles E. Mullar
His Attorney.

July 12, 1932.  H. S. HUBBARD  1,867,407
DIRECT CURRENT HIGH VOLTAGE CABLE TESTING SYSTEM
Original Filed June 25, 1928   3 Sheets-Sheet 3

Inventor:
Horace S. Hubbard
by Charles E. Tullar
His Attorney

Patented July 12, 1932

1,867,407

UNITED STATES PATENT OFFICE

HORACE S. HUBBARD, OF PITTSFIELD, MASSACHUSETTS, ASSIGNOR TO GENERAL ELECTRIC COMPANY, A CORPORATION OF NEW YORK

DIRECT CURRENT HIGH VOLTAGE CABLE TESTING SYSTEM

Application filed June 25, 1928, Serial No. 287,991. Renewed March 11, 1932.

The present invention relates to systems for measuring high voltage insulation and more particularly to direct current cable testing systems. In the copending application of F. W. Peek, Jr., Serial No. 164,083, filed January 27, 1927, there is disclosed a system for testing cable insulation in which the cable is connected to the transformer winding through a plurality of series connected vacuum tube rectifiers. The vacuum tubes disclosed in the above application are all located between the cable and one end of the transformer winding and are shunted by balancing condensers in order to equalize the voltage across the different vacuum tubes. The vacuum tubes employed in connection with the present invention as well as in the prior Peek disclosure are two-element vacuum tube half wave rectifiers of the type described in Dushman Patent No. 1,286,265.

The system described in the prior Peek application is not entirely satisfactory for extremely high voltage work, since the size of the balancing condensers necessary, in the prior application, to equalize the voltage across the vacuum tubes reaches excessive proportions and such condensers are difficult to adjust within the required limits. It is one of the objects of the present invention to provide a high voltage direct current cable testing system employing series connected vacuum tubes in which balancing condensers are either not used at all or if used the voltage across the vacuum tubes may be equalized without the employment of large size condensers in shunt with the vacuum tubes. A second object of the invention is to provide in such a cable testing system, stabilizing means whereby a proper distribution of the voltage over the transformer winding and rectifiers may be obtained during both halves of the alternating wave.

Figure 1:
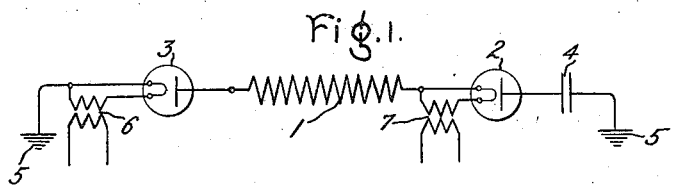
Figure 2:
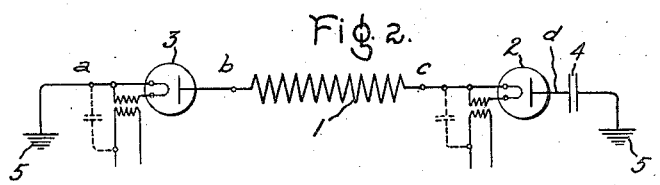
Figure 3:
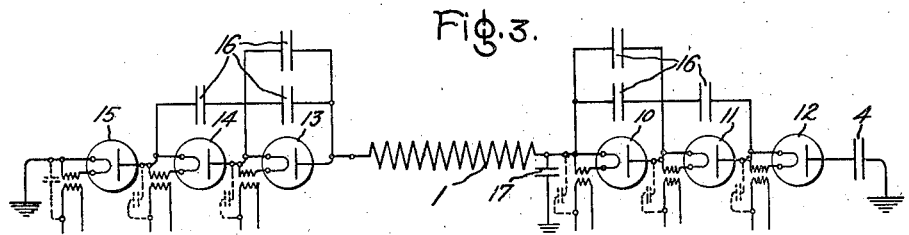
Figure 4:
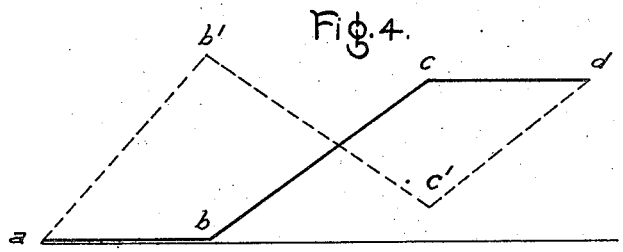
Figure 5:
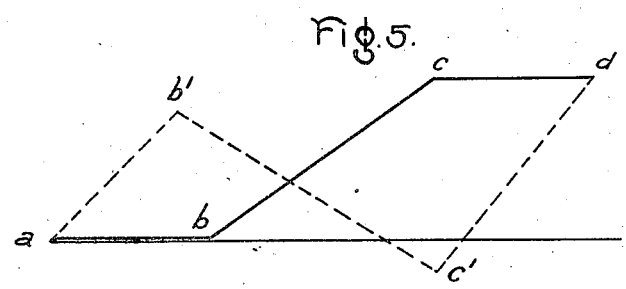
Figure 11:
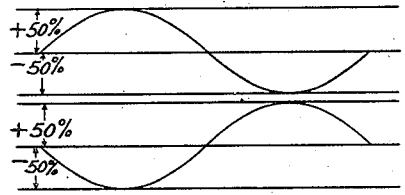
Figure 12:
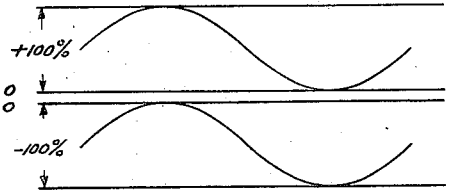
Figure 13:
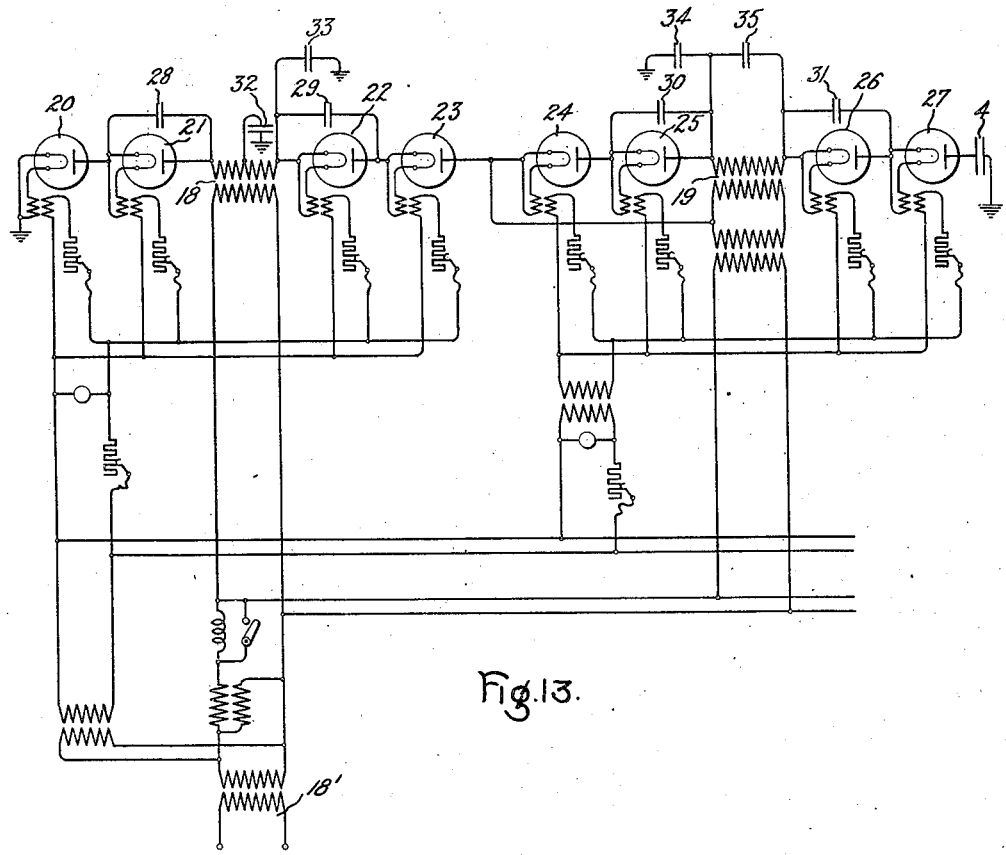

The novel features which I believe to be characteristic of my invention are set forth with particularity in the appended claims. The invention itself, however, will best be understood from reference to the following specification when considered in connection with the accompanying drawings in which Fig. 1 shows diagrammatically a circuit comprising a pair of vacuum tubes connected to opposite ends of a transformer winding and in series with a capacity load, the filaments of the vacuum tubes being supplied with current from transformer windings; Fig. 2 is a view similar to Fig. 1 in which the filament transformers are indicated as capacity units which, in effect, they are; Fig. 3 shows diagrammatically a circuit arrangement embodying features of the invention, a plurality of vacuum tubes being connected to each end of the transformer winding; Figs. 4 and 5 are vector diagrams illustrating the distribution of the voltage over a system, such as indicated in Fig. 1; Figs. 6 to 9 inclusive are diagrams illustrating various ways in which a stabilizing condenser may be connected to the cable testing system to ensure a proper distribution of voltage over the transformer winding and vacuum tubes; Fig. 10 is a vector diagram of an ideal condition of voltage distribution over a system such as illustrated in Fig. 1; Figs. 11 and 12 are oscillograph diagrams showing respectively the variations in voltage over a transformer with both ends completely insulated and with no connected apparatus, and over an insulated transformer winding connected through a rectifier to a load with the voltage properly distributed. The upper and lower portions of these figures represent respectively the voltage at each terminal of the transformer winding. Fig. 13 shows a series of transformer windings and vacuum tubes connected in series to a capacity load which in the present instance may be a cable.

Referring more particularly to the drawings, I have indicated at 1 in Fig. 1 a completely insulated secondary transformer winding adapted to be supplied with current from a primary winding, not shown. The winding 1 is connected at opposite ends thereof to vacuum tubes 2 and 3 which are connected to opposite sides of the condenser 4, the connection from vacuum tube 3 being through ground as indicated at 5. Condenser 4 may represent a cable, the insulation of which is to be tested, or any other suitable load. The filaments of the vacuum tubes 2 and 3 are supplied with heating current from transformers 6 and 7. Each of these latter transformers may be considered to be, in effect, capacity units, as illustrated diagrammatically in Fig. 2, and I have illustrated them in this manner in Fig. 2 in which the units 8 and 9 indicate the capacity of the transformers which supply the heating current to the filaments of the vacuum tubes.

Several units, such as illustrated in Figs. 1 and 2, may be connected in series when it is desired to apply very high voltages to a cable to be tested, or, if desired, a single high voltage winding may be employed with a plurality of vacuum tubes connected to each end of the winding. In the latter case it will be necessary to shunt the series connected vacuum tubes on each side of the transformer winding with balancing condensers 16, as illustrated in Fig. 3.

Where a completely insulated transformer winding is connected to a cable or capacity unit through a pair of vacuum tubes which are connected to opposite ends of the transformer winding, as in Fig. 1 balancing condensers are not required, as in the prior Peek application. Where a plurality of vacuum tubes are connected to the opposite ends of the transformer winding, balancing condensers are necessary as indicated in Fig. 3 of the drawings, although the size of such condensers is much smaller than would be the case if the vacuum tubes were all connected between one end of the transformer winding and the cable to be tested. Connecting vacuum tubes to both ends of the transformer winding permits the use of a series of small units for sets of extremely high voltages and simplifies the manufacture and tests of such systems to a considerable extent.

Although balancing condensers are not required in a circuit such as shown in Fig. 1, it is desirable to connect a condenser 17, which I term a stabilizing condenser, to the transformer winding in the manner indicated in Fig. 3 or in Figs. 6 to 9 inclusive, for the following reasons: When an alternating electromotive force is supplied to a transformer winding, such as 1 in Fig. 1, it will be clear that the filament transformer 6 cannot maintain any charge thereon, since its capacitance is continually short-circuited, as indicated at 8 in Fig. 2. Condenser 9, however, which represents the capacity of filament transformer 7, cannot discharge into the winding 1 during the inverse portion of the alternating wave since the latter is open-circuited by vacuum tube 3 which conducts current in one direction only. This causes a displacement of the total voltage over winding 1 and may result in an excessive voltage at the tube 3, the extent of the displacement of the voltage depending somewhat on the character of the main transformer 1. I have found that this displacement may be avoided by connecting a condenser to the transformer winding, as indicated at 17 in Figs. 3, or 6 to 9 inclusive, the particular connection chosen depending upon the distribution of the voltage in the system.

If an insulated transformer has approximately the same insulation at both ends thereof, the voltage at either end shifts from +50 to −50% the mid-point being 0, as indicated in the oscillograph record shown in Fig. 11. If a load is placed on the transformer the wave will shift depending on the characteristics of the circuit. With the connections employed in a rectifier circuit, such as shown in Fig. 1, it is desirable to cause the voltage to shift in the particular manner indicated in Fig. 12, in which the voltage at one end of the transformer winding shifts from 0 to +100% and at the other end from −100% to 0. This is shown vectorially in Fig. 10 to which further reference will be made.

With the connections shown in Figs. 1 and 2 the ideal condition as set forth above may not exist and the shift of the voltage may be represented vectorially by Figs. 4 or 5, the period of rectification or current flow being shown by the solid lines and the inverse portion of the wave by the dotted lines. The different points $a$, $b$, $c$, $d$, $c'$, $b'$ correspond to similar points indicated in Fig. 2. During the period of current flow the potential drop from point $a$ to $b$ is practically zero, being only the drop across the kenotron 3. This, in effect, grounds one end of the high voltage winding 1 at point $b$ so the voltage of the transformer rises from 0 at this point to a maximum at $c$ bringing that point of the rectifier and load represented as a condenser and indicated at 4, to 100% voltage. As the voltage wave reverses the transformer winding is left entirely free since the vacuum tubes conduct in one direction only. The distribution of the voltage over the transformer and consequently over the rectifiers is thus dependent upon the characteristics of the transformer and the connected apparatus. The voltage may be held up to the point $c'$, reducing the potential across the vacuum tube 2, as represented by the line $c'$ $d$, the total transformer voltage being displaced to point $b'$. This brings excessive voltage at the terminal $b$ of the transformer as well as excessive voltage across the rectifier connected to that end of the circuit represented by the line $b'$ $a$.

The characteristics of the transformer and connected equipment may be such that the voltage distribution over the transformer winding and vacuum tubes may shift in various ways. In Fig. 5 the voltage shift is in the opposite direction to that indicated in Fig. 4.

To overcome this difficutly and to establish the desired ideal condition in which a proper distribution of voltage is obtained, as illustrated in Fig. 10, the stabilizing auxiliary condenser may be applied to either end of the transformer winding as indicated in Figs. 6 and 7 depending upon which end of the transformer winding carries the excessive voltage. A further stabilizing effect may be obtained under certain conditions by the use of auxiliary condensers connected, as indicated in Figs. 8 and 9 or any desired combination of these condensers may be employed depending on the conditions to be met.

In Fig. 3 I have indicated a connection similar to that in Fig. 2. In the former figure, however, a plurality of vacuum tubes 10, 11, 12 and 13, 14, 15 are connected to each end of a high voltage secondary transformer winding whereby a high voltage may be applied to a condenser load or cable 4. With the circuit indicated it is necessary to shunt all the vacuum tubes, except the outermost ones, with equalizing condensers 16, as in the prior Peek application. The size of the equalizing condensers however are much smaller when the vacuum tubes are connected to both ends of the transformer winding rather than to one end of the winding only as in the prior Peek application.

In Fig. 13 I have illustrated a cable testing system in which the insulated secondary windings of transformers 18 and 19, supplied from an alternating source 18′, are connected in series through a plurality of vacuum tubes 20 to 27 inclusive whereby a high voltage direct current may be applied to a cable indicated on the drawings as a capacity unit 4. The transformer connections for obtaining the high voltage constitute no part of the present invention. By connecting the vacuum tubes to each end of the secondary windings a very high voltage may be applied to the condenser load or cable. The voltage across the rectifier units may be equalized by employing a balancing condenser 28, 29, 30 or 31 with each vacuum tube adjacent the transformer windings when two vacuum tubes are connected to each end of the windings. In order to maintain the proper voltage distribution over the transformer stabilizing condensers 32 to 35 inclusive may be employed and connected to the transformers either singly as indicated in Figs. 6 to 9 inclusive or combined, the choice of connections or combinations of condensers depending upon the characteristics of the transformer and load.

What I claim as new and desire to secure by Letters Patent of the United States, is:—

1. In combination, an insulated transformer winding, a capacity load connected in series with said winding, a vacuum tube rectifier connected between each end of said winding and said load, and a condenser connected to the transformer winding to control the voltage distribution over the transformer winding and rectifiers.

2. In combination, an insulated transformer winding, a capacity load connected in series with said winding, a plurality of vacuum tube rectifiers connected between each end of said winding and said load, means whereby the voltage assumed by said rectifiers may be equalized, and an auxiliary stabilizing condenser connected to said transformer winding to control the voltage distribution over the winding and rectifiers.

3. In a cable insulating testing device, a plurality of insulated transformer windings adapted to be connected in series to a cable to be tested, a plurality of vacuum tube rectifiers connected between said transformer windings, and means whereby an alternating electromotive force may be supplied to said transformer windings.

4. In a cable insulating testing device, a plurality of insulated transformer windings adapted to be connected in series to a cable to be tested, a plurality of vacuum tube rectifiers connected between said transformer windings, means whereby an alternating electromotive force may be supplied to said transformer windings, and means equalizing the voltages assumed by said rectifiers.

5. In a cable insulating testing device, a plurality of insulated transformer windings adapted to be connected in series to a cable to be tested, a plurality of vacuum tube rectifiers connected between said transformer windings, means whereby an alternating electromotive force may be supplied to said transformer windings, means equalizing the voltages assumed by said rectifiers, and a condenser connected to said transformer windings to control the voltage distribution over the transformer windings and rectifiers.

6. In combination, an insulated transformer winding, a capacity load connected in series with said winding, a plurality of vacuum tube rectifiers connected between each end of said winding and said load, and means comprising capacity units for equalizing the voltage assumed by said rectifiers.

In witness whereof, I have hereunto set my hand this 22nd day of June, 1928.

HORACE S. HUBBARD.

CERTIFICATE OF CORRECTION.

Patent No. 1,867,407.                                                      July 12, 1932.

HORACE S. HUBBARD.

It is hereby certified that error appears in the printed specification of the above numbered patent requiring correction as follows: Page 2, line 5, beginning with ", and" strike out all to and including "tubes" in line 10; and that the said Letters Patent should be read with this correction therein that the same may conform to the record of the case in the Patent Office.

Signed and sealed this 1st day of November, A. D. 1932.

(Seal)                                                     M. J. Moore,
                                                                    Acting Commissioner of Patents.